United States Patent [19]
Gerve et al.

[11] 3,835,326
[45] Sept. 10, 1974

[54] METHOD OF DETERMINING THE SPEED OF ROTATING BODIES

[75] Inventors: Andreas Gervé, Linkenheim; Gunder Essig, Karlsruhe; Bernhard Herkert, Neureut, all of Germany

[73] Assignee: Gesellschaft fur Kernforschung mbH, Karlsruhe, Germany

[22] Filed: Mar. 27, 1973

[21] Appl. No.: 345,460

[30] Foreign Application Priority Data
Mar. 27, 1972  Germany............................ 2214859

[52] U.S. Cl.................... 250/393, 73/488, 250/503, 250/505
[51] Int. Cl. ............................................... G01t 1/16
[58] Field of Search ........... 250/393, 303, 505, 514; 73/488, 494

[56] References Cited
UNITED STATES PATENTS
2,692,951  10/1954  Voelker ............................ 250/393
3,303,419  2/1967  Gith ............................... 250/393 X

*Primary Examiner*—Archie R. Borchelt
*Attorney, Agent, or Firm*—Spencer & Kaye

[57] ABSTRACT

The rotational speed of a rotating body is determined by providing an activated point on one end surface of the body so that it emits radiation. A shield for the radiation is placed adjacent this axial surface of the body in such a position that it covers only a portion of the axial surface. A detector is aligned with the uncovered portion of the body for detecting the radiation emitted by the activated point on the body and the detector registers the emitted radiation as sequences of pulses. By determining the time between successive sequences of pulses, the speed or the rotating body can be determined.

11 Claims, 3 Drawing Figures

PATENTED SEP 10 1974 3,835,326 ively, which can be used to measure the kinematics of high speed and slightly loaded antifriction bearings between zero and a minimum of $n \times d = 5 \times 10^6$ mm min$^{-1}$ ($n$ = speed, $d$ = diameter of component).

METHOD OF DETERMINING THE SPEED OF ROTATING BODIES

BACKGROUND OF THE INVENTION

The present invention relates to a method of determining the speed of rotating bodies, e.g., rollers or balls, supported in a bearing and to a device for implementation of the present method and a circuit for processing the corresponding pulses.

In the publication to G. R. Higginson, Proceedings of the Institution of Mechanical Engineers 1967–68, Volume 182 Part 3 G, pp. 62–63 a method is disclosed for measuring the angular velocity of rollers in roller bearings. Stroboscopic or magnetic methods are used for this purpose.

One of the disadvantages in carrying out these methods is that one roller must be interfered with by the measuring device which will exert forces upon the bearing which could impair the running behavior of the bearings. Furthermore, with these methods, low speeds down to a speed of zero cannot be measured and wear measurements are disturbed, because abrasive particles adhere to the magnetic measuring device.

SUMMARY OF THE INVENTION

It is the purpose of the present invention to make available a suitable method and a suitable device and circuit, respectively, which can be used to measure the kinematics of high speed and slightly loaded antifriction bearings between zero and a minimum of $n \times d = 5 \times 10^6$ mm min$^{-1}$ ($n$ = speed, $d$ = diameter of component).

According to the invention this problem is solved in that a portion of one front surface of each of the bodies, which portion is almost a point, is activated, a shielding with a gap is set up in front of the bodies to cover a least part of the bodies, a detector arranged behind the shielding but in front of the gap registers the radiation emanated by the activated point as pulses or as a current or voltage signal and that the time between the beginning or the end of a first sequence of pulses or of the current or voltage signal and the beginning or the end of another sequence of pulses or current or voltage signal following the first one is measured, with the time measured corresponding to the total or a fraction of the time of revolution of the activated point. If there is only a low energy radiation emitted by the activated point, the shielding may be constituted by one of the bearing rings proper. The bodies are preferably activated close to the rolling surface.

A device for implementing the method according to the present invention is characterized in that a concentric shielding, e.g., of lead, is arranged in front of the bearing with the body containing an activated point, which shielding consists of a disk and an outer ring which constitute an annular gap. In another design of the device according to the present invention the shielding may consist of an outer ring only.

In a suitable circuit for processing the sequences of various pulse densities according to the method constituting the present invention, an amplifier amplifies the pulses generated in the detector, a filter with a variable critical frequency generates a linear superposition of the pulse transients, and a trigger connected in series with a filter generates trigger pulses from the super imposed signal generated by the filter. These trigger pulses can be registered by a scaler and from the frequency of the pulses the time required to assess the time of revolution can be determined. In one possible embodiment of this circuit a discriminator may be connected in between the detector and the filter. Moreover, an oscilloscope can be connected between the output of the filter and the trigger, and a counter may be connected in series with the trigger and a printer in series with the counter, respectively.

The present method according to the invention is particularly suited for studies of the motion of high speed antifriction bearings; operating conditions may be chosen so as to cause premature failure of the bearings because of high wear. Wear measurements and speed measurements of the components of the bearing in particular are performed with the use of radioisotopes. One possibility for providing the radioisotopes consists in activation of the mechanical components with neutrons in a nuclear reactor. The mechanical components to be activated are exposed to the neutron flux of a nuclear reactor and thoroughly activated. However, in-pile irradiations are limited by the shape of the components to be activated — the components (bodies) must fit into the beamhole — and by their weight, because the overall activity must not exceed the radiation protection regulations with respect to assembly work.

Another possibility for activating the components is with the use of deuterons in a cyclotron. The deuteron beam is directed at the part to be activated. When entering the material, the deuterons are greatly slowed down, which activates surface layers between several hundredths and a few millimeters deep depending on the initial energy. The beam cross section is approximately 20 mm². If larger areas are to be activated, the component must be moved in front of the beam in a suitable way. Thus, this method can be used also to activate major components in specific places, which greatly extends the application of isotope methods.

It is possible also to equip components whose speed is to be measured with an $\alpha$ and/or $\beta$-radiation compound; in this way, only the type of shielding used (lead collimators are no longer necessary) and the type of detection must be taken into account.

Below, the present invention will be explained on the basis of an example of a measurement of the speed of rollers; the possibilities of measuring the speed of a ball and the movement of the bearing and the slippage between the components (bodies) should not be excluded.

The present invention will be explained in greater detail below on the basis of an embodiment described in FIGS. 1–3.

DESCRIPTION OF THE PREFERRED EMBODIMENTS

Figure 1:
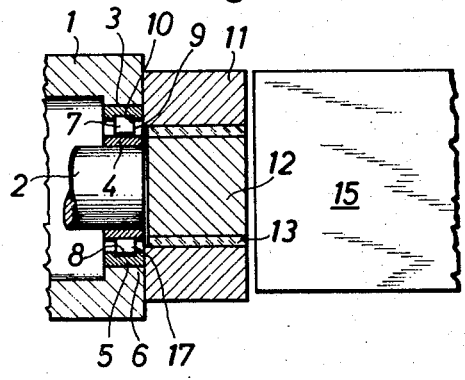
FIG. 1 is a partly cross-sectional, side elevational view of an embodiment of a roller bearing assembly and detector arrangement according to the present invention.

As shown in FIG. 1 a shaft 2 is supported in casing 1 by means of the roller bearing 3 (with or without a cage). The shaft 2 is driven by a motor not shown in detail. The shaft 2 carries an inner ring 4 of the roller bearing 3 which has been shrink fitted, while the outer ring 5 of the roller bearing 3 is supported in the wall of the casing 6. The roller bearing 3 consists of individual rollers whose rolling surfaces 7 move on the inner and outer rings 4 and 5. The outer ring 5 has a recess 8 holding the rollers of the roller bearing 3.

The speed of the rollers of the roller bearing 3 is to be measured. For this purpose, at least one roller 17 must be provided with an activated point 10 in its front, or axial, surface 9 close to the rolling, or circumferential, surface 7, which activated point would emit ionizing radiation ($\alpha$, $\beta$, $\gamma$, neutron radiation). In front of the roller bearing 3 there is a lead collimator consisting of an outer ring 11 and an inner disk 12. The inner diameter of the outer ring 11 and the outer diameter of the inner disk 12 are so dimensioned as to leave an annular gap 13 between them. This annular gap 13 may be filled with plexiglass or some other material permeable to ionizing radiation. The plexiglass or the permeable material, respectively, supports the inner disk 12 relative to the outer ring 11. The inner diameter of the outer ring 11 must also be dimensioned in such a way that the activated point 10 on the front face 9 of a roller 17 will disappear behind the outer ring 11 at least temporarily during rotation, viewed in the axial direction of the shaft 2. Moreover, the outer diameter of the inner disk 12 must be dimensioned so that the activated point 10 will come into the range of the annular gap 13 at least temporarily and in this way radiation emitted by this activated point 10 will reach a detector 15 set up behind the annular gap 13, but in front of the roller bearing 3. This detector 15 may consist, for example, of a sodium iodide scintillation crystal with a photomultiplier connected to it, if the radiation emitted by the activated point 10 is $\gamma$-radiation.

If the activated point consists of an $\alpha$ or $\beta$-source attached to the front surface 9 of the roller 17, there is no need for the lead collimator consisting of the outer ring 11 and the inner disk 12, and the detector 15 can be set up right in front of the roller bearing 3. Since $\alpha$ and $\beta$-radiations have a low penetration, even the wall of the outer ring 5 of the roller bearing 3 in the area of the recess 8 is sufficient at least temporarily, to shield against all the radiation emitted by the activated point 10.

If the activated point 10 is located in the right place and if the inner diameter of the outer ring 11 is chosen appropriately, even the inner disk 12 of the lead collimator may be omitted.

Figure 2:
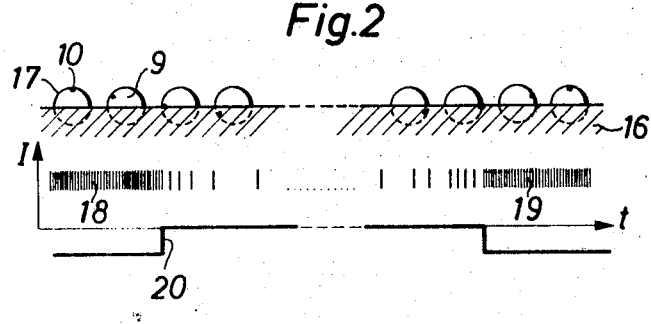
FIG. 2 is a schematic view presenting a developed representation of part of the arrangement of FIG. 1, together with an illustration of the resulting speed measurement signal.

FIG. 2 is a representation of the principle of speed measurement by means of the device according to FIG. 1; however, for the sake of simplicity, the lead collimator has been designed as a plain lead collimator 1. Behind the lead collimator 16, a roller 17 of the roller bearing 3 according to FIG. 1 is shown in various rotational positions, the activated point 10 being clearly visible in one case and disappearing behind the lead collimator 16 in another case. In the latter case, the roller 17 is arranged behind the lead collimator 16 so that half of the roller 17 and the front surface 9 of the roller, respectively, is covered by that collimator. Hence, the activated point 10 is plainly visible for half the revolution time of the roller 17 and the radiation emitted by the activated point 10 can be received by the detector 15 according to FIG. 1. Beneath the lead collimator 16 a diagram is shown on which the pulses I are plotted as a function of the time $t$. While the activated point 10 is not covered by the lead collimator 16, many single pulses 18 will be received by the detector 15, which pulses are connected in a pulse sequence. If the activated point 10 disappears behind the lead collimator 16, the number of pulses per unit time becomes smaller and another pulse sequence 19 will not begin until the activated point 10 reappears behind the collimator 16. A new pulse sequence 19 will be generated for another half of the period of revolution. These pulse sequences 18 and 19 and other pulse sequences, respectively, not shown on the diagram are processed in a circuit, which will be further described below, which delivers a pulse at its output shown below the time axis $t$. This pulse 20 has a rectangular shape, and its frequency corresponds to the period of revolution of the activated point 10. This period of revolution can be used to calculate the speed of the roller 17 and of the roller bearing 3, respectively. The pulse 20 in this case is shaped so that its leading edge begins with the end of the pulse sequence 18 and its trailing edge is generated as the pulse sequence 19 is formed. It is possible also to assess the time between the beginning of the pulse sequence 18 (or a current or voltage signal) and the beginning of the pulse sequence 19 or between the end of the pulse sequence 18 and the pulse sequence 19 in order to calculate the speed.

Figure 3:
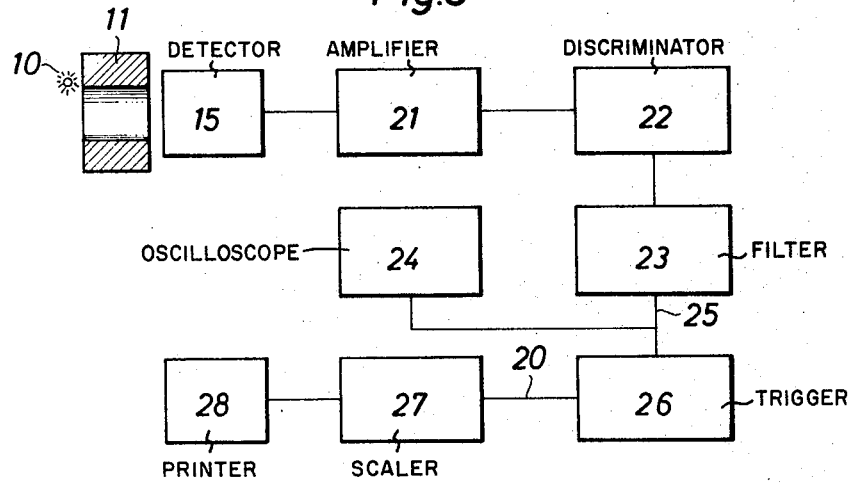
FIG. 3 is a block circuit diagram of one embodiment of the detector circuit according to the present invention.

The pulses emitted by the activated point 10 and partly absorbed by the collimator 11 (outer ring in FIG. 1) are processed in the circuit shown in FIG. 3. The detector 15 records the pulse sequence 18 and 19. The single pulses have different heights and are randomly distributed. Afterwards they are amplified in the amplifier 21 and converted into pulses of the same height, but randomly distributed, in the discriminator 22. (The discriminator 22 may also be omitted). A filter 23 is connected to the output of the discriminator 22, which filter has a variable critical frequency. This filter 23 generates transients out of the pulse sequences segregated by the discriminator, which transients are linearly superimposed. This superposition and this superimposed signal, respectively, are characterized by an interference modulation which is due to the random distribution of the single pulses from the discriminator 22. The density of the pulses supplied to the filter 23 later on is expressed in the height of the output signal and the superimposed signal respectively, of the filter 23. The filter 23 is faster than a rate meter and will respond to any change in the density of pulses.

An oscilloscope 24 is connected to the output of the filter 23 on the screen of which the superimposed signal 25 can be observed. Moreover, a trigger 26 is directly connected in series with the filter 23, at the output of which trigger rectangular pulses are generated which are identical with the pulses 20 according to FIG. 2. These pulses 20 can be counted in a scaler 27 and printed in a printer 28.

We claim:

1. A method for determining the rotational speed of a rolling body of a rotary bearing comprising the steps of: activating substantially a point on one end surface of the body so that it emits radiation; placing a radiation shield adjacent the end surface for covering only a first portion of the end surface of the body and defining a radiation passage which is aligned with a second portion of the body and concentric with said bearing; arranging a detector on the opposite side of the shield from the body and in alignment with the radiation passage; registering, in the detector, sequences of signals representing the radiation received from the activated point on the body; and determining the cycling time between successive sequences of signals, which time is related to the period of revolution of the activated point and accordingly to the speed of the body.

2. A method as defined in claim 1, wherein the body is activated close to its rolling surface.

3. A method as defined in claim 1, wherein the shield is provided by a portion of said bearing supporting the rolling body, and low energy radiation is emitted by the activated point.

4. An arrangement for determining the rotational speed of a rolling body of a rotary bearing comprising: radiating means disposed on a point on an end surface of the body for emitting radiation; a radiation shield disposed adjacent the end surface of the body covering a first portion of the body and defining a radiation passage which is aligned with a second portion of the body and concentric with said bearing; circuit means for detecting the emitted radiation passing through said radiation passage and for determining the rotational speed of the body as a function of the emitted radiation.

5. An arrangement as defined in claim 4, wherein said shield is arranged concentrically with said bearing and includes an outer ring arranged to cover said first portion of said body.

6. An arrangement as defined in claim 5 wherein said shield further includes a disc concentrically arranged within said outer ring and spaced from the inner peripheral surface of said outer ring so as to form an annular gap which constitutes said radiation passage.

7. An arrangement as defined in claim 4 wherein said circuit means is capable of detecting strong radiation and includes a sodium iodide scintillation crystal with a photomultiplier.

8. An arrangement for determining the rotational speed of a rolling body as defined in claim 4 wherein said circuit means comprises in combination: detecting means aligned with said radiation passage for detecting the emitted radiation and registering the radiation as sequences of signals; amplifying means for amplifying the sequences of signals; filter means with a variable critical frequency for generating a linear superimposed signal of the signals in eachsequence; and trigger means connected in series with the output of said filter for generating pulses from the superimposed signals, which pulses can be recorded by a scaler and from the frequency of which the time required to determine the period of revolution of said body can be determined.

9. A circuit arrangement as defined in claim 8 further comprising: a discriminator connected between said detecting means and said filter means for equalizing the amplitude of the signals of each sequence.

10. A circuit arrangement as defined in claim 8 further comprising: an oscilloscope connected prior to said trigger means at the output of said filter means for displaying the superimposed signals.

11. A circuit arrangement as defined in claim 8 further comprising: a counter connected in series with the output of said trigger means and a printer connected in series with the output of said counter.

* * * * *